Aug. 7, 1956   J. C. WAYNE   2,757,909
AGITATOR DEVICE FOR A MIXER
Filed April 29, 1953   2 Sheets-Sheet 1
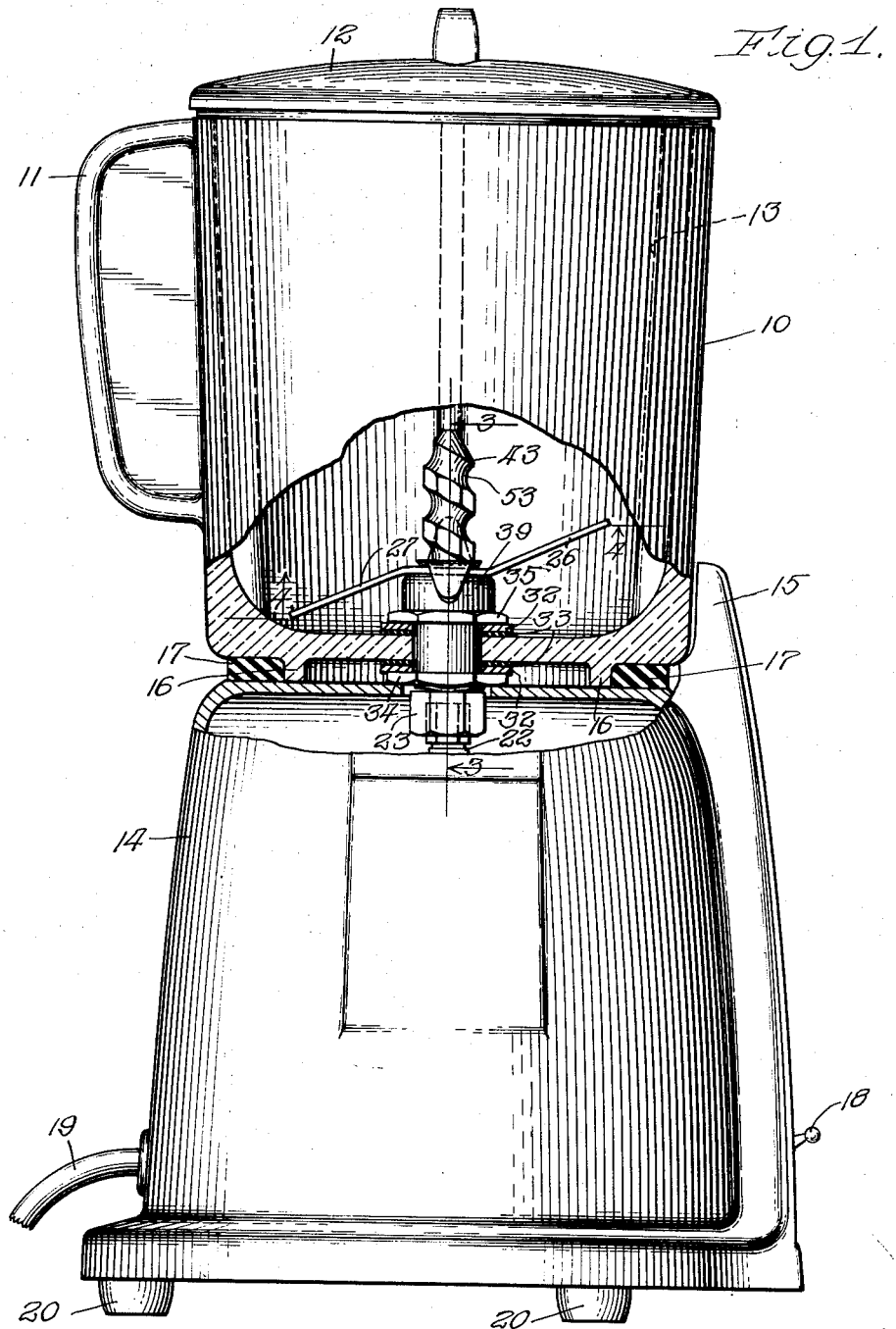

Aug. 7, 1956    J. C. WAYNE    2,757,909
AGITATOR DEVICE FOR A MIXER
Filed April 29, 1953    2 Sheets-Sheet 2
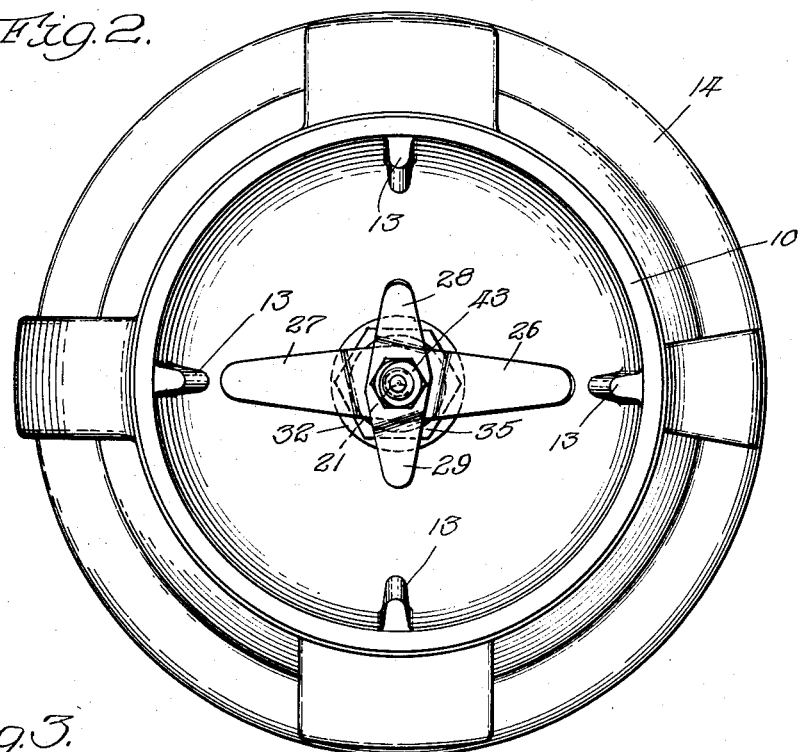
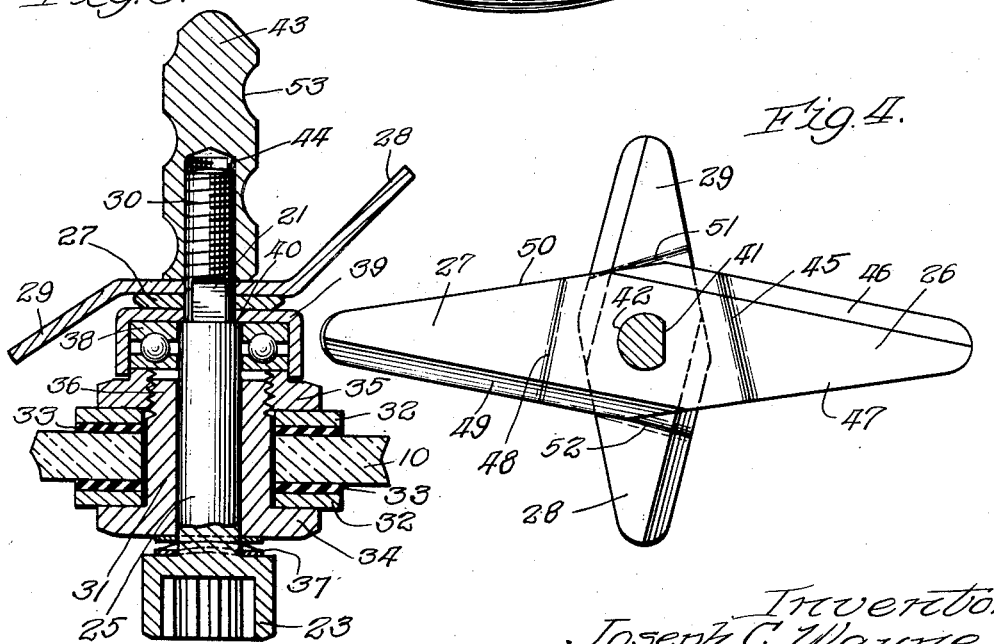
Inventor:
Joseph C. Wayne,
By Schroeder, Merriam,
Hofgren & Brady, Attys.

United States Patent Office 2,757,909
Patented Aug. 7, 1956

2,757,909

AGITATOR DEVICE FOR A MIXER

Joseph C. Wayne, Chicago, Ill., assignor to Birtman Electric Company, a corporation of Illinois Application April 29, 1953, Serial No. 351,862

1 Claim. (Cl. 259—107)

This invention relates to an agitator device for a mixer.

Food mixers of the type employing rotating blades near the bottom of a bowl intended to hold the material being mixed are widely used for high speed mixing, disintegrating and blending. These mixers, while being efficient with most ordinary materials, have not been too effective when used with liquids of relatively high viscosity such as thick soups and the like. An air bubble or pocket tends to form directly above the blades of the mixer in these circumstances, and prevents much of the liquid in the container from circulating downwardly through the mixing blades in an efficient manner.

Another difficulty with these prior mixers was experienced in attempting to disintegrate relatively hard materials such as ice cubes in the absence of appreciable amounts of liquid. With the prior mixers the hard ice cubes or the like merely bounced on top of the rotating blades.

The present invention solves both these problems. Thus the new agitator effectively prevents the formation of any sizeable air bubbles in the liquid and sets up a constant pattern of circulation, conducting the top portion of the liquid centrally downwardly through the blades of the mixer, and allowing liquid to rise to the surface outwardly of the blades. The present mixer also is constructed to reduce quickly solid material such as fruits, vegetables and the like. It is also capable of reducing ice cubes to a snow-like consistency. In spite of the added functions, the load on the motor is relatively low.

The invention is illustrated in one embodiment in the accompanying drawings, in which:

Fig. 1 is an elevational view, partially broken away, of one embodiment of the complete mixer;

Fig. 2 is a top plan view of the mixer of Fig. 1 with the cover of the container removed;

Fig. 3 is a fragmentary sectional view taken along line 3—3 of Fig. 1; and

Fig. 4 is a sectional view taken along line 4—4 of Fig. 1.

In the embodiment shown, a container 10 having a handle 11, a cover 12 and internal ribs 13 is mounted upon a housing 14 for a motor (not shown). A projecting stud 15 on the housing assists in positioning a polygonal rib 16 on the bottom of the container within a resilient rubber ring 17 attached to the housing. Starting switch 18, wiring 19 for the motor, and housing supports 20 complete the housing.

The agitator device, generally designated 21, is driven by a motor shaft 22 which imparts its rotary motion thereto by engagement with a socket-head bolt 23 penetrating an opening in the bottom of the container 10. The shaft 25 of the bolt 23 mounts the four cutting blades 26, 27, 28 and 29 which may be secured to the threaded end 30 of the shaft.

Means is provided for securing the agitator in upright position to the bottom of the container 10. A bolt-like sleeve 31 surrounds the shaft 25 of the bolt 23 and makes a close annular fit with the opening 24 in the container 10. Metal washers 32 and resilient rubber washers 33 are held firmly in place by the polygonal flange 34 on the sleeve 31 and by the nut 35 on the threaded end 36 of the sleeve 31. A spring washer 37 yieldingly spaces the head 23 of the socket-head bolt from the sleeve.

An upper bearing surface 38 for the upper portion of the shaft 25 is enclosed by a cap 39 which rests upon the shoulders 40 of the socket-head bolt 23.

The threaded end 30 of the bolt 23 has a flattened face 41 extending down the bolt to the shoulders 40. The cutting blades 26, 27, 28 and 29, to be more specifically described later, each has a central aperture 42 corresponding to a cross-section of the threaded end 30 of the bolt 23. The apertures are preferably arranged so that the blades are at substantially right angles to each other. As herein shown, the blades are maintained upon the bolt by a helical member 43, having an internally threaded recess 44 secured upon the threaded end 30 of the bolt 23.

The cutting blades 26, 27, 28 and 29 are preferably bent as best shown in Fig. 4. Blade 26 is bent upwardly along a line 45 so that the leading cutting edge 46 is inclined slightly upwardly out of the plane of rotation of the trailing edge 47, and blade 27 is bent downwardly along line 48 so that the leading cutting edge 49 is likewise so inclined with respect to trailing edge 50. In like manner, and for the same reason, blades 28 and 29 are respectively bent upwardly along line 51 and downwardly along line 52. The blades thus act to force material downwardly, then outwardly along the bottom of the bowl, then upwardly along the sides of the bowl and then downwardly through the rotating blades.

The member 43 has a helically grooved surface 53 of shallow depth and is rotated with the cutting blades to direct mixed materials contacting this member downwardly toward the rotating blades. This member 43 prevents the formation of any large gas bubble in the liquid above the blades, and thus assures a continuous pattern of liquid circulation in the container. It is, of course, apparent that inclined surfaces of small area may be arranged on an upright element to serve the function of the helical member. A helix has been found to be most satisfactory, however, since it gets the desired results without serious overloading of the motor driving the device. Furthermore, it does not interfere with the introduction of material into the bowl.

In operation, the cutting blades and the helical member rotate at the same angular velocity. During rotation each of the angularly bent blades describes a separate zone of agitation. In the preferred embodiment, the ends of the short and long upwardly inclined blades, 26 and 28 respectively, rotate in approximately the same plane, the end of the short blade describing a circle of somewhat smaller diameter than does the end of the long blade. As a result of this construction, the relatively long blade 26 is inclined upwardly at a relatively small angle to the horizontal while short blade 28 is inclined upwardly at a relatively great angle to the horizontal. As is shown most clearly in Figures 1 and 3, downwardly inclined blades 27 and 29 have this same angular relationship to each other. Since these blades described separate zones of agitation, the liquid immediately above the blades is kept in a constant state of turbulence. Thus both solids and liquids are prevented from riding upon any relatively calm strata of liquids over the blades, as so frequently happens in other mixers, and a more thorough mixing and blending operation results.

The operation of this invention upon solids can be conveniently shown with regard to dry ice cubes which are difficult to disintegrate. They are struck by the cutting edges of the blades, being initially chipped and are then deflected outward and upward to the sides of the container. The cubes richochet from the container and fall by gravity to again contact the blades for successive chipping until completely disintegrated, the chipped dry ice accumulating on the inner periphery and bottom of the container from which it is removed for use. Due to the four blades functioning in four separate zones of agitation, the dry ice cubes are constantly being struck from different points which prevents them from riding on top of the blades as they tend to do in other mixers. This particular action permits the disintegration of ice cubes into snow without having to add liquid. The snow created in this manner is dry and is particularly suitable for mixed drinks.

The action is somewhat different when dissipating solids such as ice cubes in liquid. Here they are carried downwardly into the zones of rotation of the blades by the currents in the liquid set up by the helical member and by the turbulence in the liquid caused by the blades. The cubes are struck by one of the blades, are initially chipped and deflected outward and upwardly. The turbulence of the liquid carries the cubes back into the blades for successive chipping and eventual disintegration.

The foregoing detailed description is given for clearness of understanding only, and no unnecessary limitations should be understood therefrom, for some modifications will be obvious to those skilled in the art.

I claim:

A food mixer for household use comprising a bowl having inner side surfaces and a bottom surface, and an agitator device normally rotatable in said bowl about an axis that is generally at a right angle to said bottom surface, the agitator device including a pair of crossed, elongated, flat agitator members intersecting each other intermediate their ends substantially at said axis and presenting cutting-breaking-mixing edges in the direction of rotation of said device, each agitator member having one end turned downwardly and the other end turned upwardly to provide two pairs of blades, an adjacent pair of long and short blades extending above a plane that is generally at a right angle to said axis passing substantially through the point of intersection of said agitator members and a second adjacent pair of long and short blades extending below said plane, successive blades being alternately long and short with both downturned blades having their outer ends adjacent to said bottom surface of the bowl and both upturned blades having their outer ends a relatively short distance above said plane, each long blade of said pairs of blades being at a relatively small angle to said plane and each short blade of said pairs being at a relatively large angle to said plane so that each of said blades passes through a separate zone during rotation of said agitator device, the outer ends of each pair of said adjacent pairs of blades terminating approximately in a substantially common plane that is at a substantially right angle to said axis.

References Cited in the file of this patent

UNITED STATES PATENTS

| 1,399,740 | Bott | Dec. 13, 1921 |
| 1,915,053 | Dobyns | June 20, 1933 |
| 2,585,255 | Kockner et al. | Feb. 12, 1952 |

FOREIGN PATENTS

| 650,386 | Great Britain | Feb. 21, 1951 |